United States Patent
Messerly et al.

(10) Patent No.: US 6,253,957 B1
(45) Date of Patent: Jul. 3, 2001

(54) METHOD AND APPARATUS FOR DISPENSING SMALL AMOUNTS OF LIQUID MATERIAL

(75) Inventors: James W. Messerly, Stow, OH (US); Laurence B. Saidman, Duluth, GA (US); James C. Smith, Amherst, OH (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 09/070,946

(22) Filed: May 1, 1998

Related U.S. Application Data (63) Continuation-in-part of application No. 08/682,160, filed on Jul. 17, 1996, now Pat. No. 5,747,102, which is a continuation-in-part of application No. 08/607,126, filed on Feb. 26, 1996, now abandoned, which is a continuation-in-part of application No. 08/559,332, filed on Nov. 16, 1995, now abandoned.

(51) Int. Cl.$^7$ .................................................. G01F 11/00
(52) U.S. Cl. .......................... 222/1; 222/61; 222/146.5; 222/309; 222/504; 222/518
(58) Field of Search .......................... 222/1, 61, 146.5, 222/309, 389, 494, 495, 496, 504, 518

(56) References Cited

U.S. PATENT DOCUMENTS

| | | | |
|---|---|---|---|
| 2,025,509 | 12/1935 | Hieber | 219/27 |
| 3,943,527 | 3/1976 | Hartmann | 346/33 |
| 3,982,724 | 9/1976 | Citrin | 251/7 |
| 4,066,188 | 1/1978 | Scholl et al. | 222/146 |
| 4,120,086 | 10/1978 | Crandell | 29/611 |
| 4,161,386 | 7/1979 | Osuna-Diaz | 425/549 |
| 4,447,706 | 5/1984 | Eder et al | 219/299 |
| 4,644,140 | 2/1987 | Hillinger | 219/535 |
| 4,711,379 | 12/1987 | Price | 222/504 |
| 4,784,582 | 11/1988 | Howseman, Jr. | 417/375 |
| 4,826,135 | 5/1989 | Mielke | 251/333 |
| 4,848,606 | 7/1989 | Taguchi et al. | 222/333 |
| 4,926,029 | 5/1990 | Pearson | 219/421 |
| 4,942,998 | 7/1990 | Horvath et al. | 228/102 |
| 4,953,755 | 9/1990 | Dennison | 222/146.5 |
| 4,967,933 | 11/1990 | Maiorca et al. | 222/1 |
| 5,052,338 | 10/1991 | Maiorca et al. | 118/668 |
| 5,074,443 | 12/1991 | Fujii et al. | 222/639 |
| 5,151,025 | 9/1992 | Müller | 425/199 |
| 5,205,439 | 4/1993 | Strum | 222/1 |
| 5,207,659 | 5/1993 | Pennaneac'h et al. | 222/494 |
| 5,277,344 | 1/1994 | Jenkins | 222/504 |
| 5,320,250 | 6/1994 | La et al. | 222/1 |
| 5,328,085 | 7/1994 | Stoops et al. | 228/33 |
| 5,462,199 | 10/1995 | Lenhardt | 222/54 |
| 5,524,792 | 6/1996 | Wakabayashi et al. | 222/146.5 |
| 5,524,795 | 6/1996 | Lee | 222/495 |
| 5,738,136 | 4/1998 | Rosenberg | 222/518 |
| 5,747,102 | 5/1998 | Smith et al. | 427/96 |

FOREIGN PATENT DOCUMENTS

| | | | |
|---|---|---|---|
| 0423388 A1 | 4/1991 | (EP) . | |
| 2036279 | 12/1970 | (FR) . | |
| 2637520 | 4/1990 | (FR) . | |
| 8400922 | 3/1984 | (WO) | 222/496 |
| WO 9718054 | 5/1997 | (WO) . | |

OTHER PUBLICATIONS

Asymtek, *Dispensing for Surface Mount Shoots into the Future with DispenseJet™ Technology from Asymtek*, Asymtek Engineering Tech Report, undated.

Douglas Shade, *Viscosity and its Relationship to Fluid Dispensing*, Electronic Packaging & Production, Jun. 1991.

Brian J. Hogan, *Adhesive Dispenser Provides+Volume Repeatability*, Design News, Apr. 11, 1994 pp. 75, 77.

*Primary Examiner*—Joseph A. Kaufman
(74) *Attorney, Agent, or Firm*—Wood, Herron & Evans, L.L.P.

(57) ABSTRACT

Apparatus and methods for dispensing droplets of liquid or viscous material. The apparatus generally comprises a valve operated dispenser and a control for moving the valve member with respect to a valve seat in rapid succession. This rapidly accelerates liquid or viscous material in a stream from the dispenser outlet and immediately breaks the stream into a minute droplet. Various embodiments of the valve seat include both rigid valve seats and resilient valve seats. Resilient valve seats are especially useful for dispensing solder pastes as they can prevent material flaking, compacting and clogging conditions. Low friction polymer or plastic material for dispenser components such as the valve member and outlet structure can also prevent such problems.

14 Claims, 4 Drawing Sheets

METHOD AND APPARATUS FOR DISPENSING SMALL AMOUNTS OF LIQUID MATERIAL

RELATED APPLICATIONS

This is a continuation-in-part of U.S. patent application Ser. No. 08/682,160 filed Jul. 17, 1996, now U.S. Pat. No. 5,747,102, which is a continuation-in-part of U.S. patent application Ser. No. 08/607,126 filed Feb. 26, 1996, now abandoned, which in turn is a continuation-in-part of U.S. patent application Ser. No. 08/559,332 filed Nov. 16, 1995, now abandoned. The disclosures of each of these prior applications and patents are hereby incorporated into the present application by reference.

FIELD OF THE INVENTION

This invention relates to the field of dispensing liquid materials, and more particularly, to a method and apparatus for rapidly dispensing minute amounts of viscous material, such as adhesives, solder fluxes, solder pastes or other such materials. These materials are generally dispensed in small quantities during the assembly of, for example, electronic components and printed circuit boards. It will be appreciated that the invention has broader applications and may be advantageously employed in other industries as well.

BACKGROUND OF THE INVENTION

There are three general types of printed circuit (PC) boards. A surface mount board utilizes components that may be secured to a surface of the PC board by an adhesive or by a solder paste. Boards with adhesively secured components are usually sent through a wave solder machine to complete the electrical connections. When solder paste is used to secure components to the board, the solder paste is heated, reflowed and cured to both secure the components to the board and complete the electrical connections. The second type of board uses through hole components. As the name implies, these electrical components have leads that extend through holes or openings in the board. The leads are soldered to complete the electrical connections. In a mixed technology board, a combination of surface mount components and through hole components are used and generally manufactured by combining the methods described above.

In each manufacturing method, a soldering operation is required on one surface of the board. The entire soldering process is comprised of three general steps which are normally performed by a single machine. These steps include (i) flux application, (ii) preheating the board, and (iii) soldering. Soldering flux is generally defined as a chemically and physically active formula which promotes wetting of a metal surface by molten solder, by removing the oxide or other surface films from the base metals and the solder. The flux also protects the surfaces from reoxidation during soldering and alters the surface tension of the molten solder and the base metal. A printed circuit board must be cleaned with flux to effectively prepare the board for soldering with a lead based or other metal based solder paste.

In the manufacture of printed circuit boards or other products, it is frequently necessary to apply minute amounts or droplets of liquid materials, including solder flux and solder paste, to a substrate or workpiece. These droplets can be on the order of 0.10 inch diameter and less. Such materials can generally have a viscosity greater than 25,000 centipoise and in the case of solder pastes, for example, may have a viscosity of 300,000 centipoise or above. These liquid and viscous materials, besides solder flux and solder paste, include adhesives, solder mask, grease, oil, encapsulants, potting compounds, inks, and silicones.

Methods of applying minute drops of liquid or viscous material have, for example, relied on syringes or other positive displacement devices. Typically, as discussed in U.S. Pat. No. 5,320,250, syringe dispensers place the syringe tip of the dispenser very close to the substrate. This may be a distance of 0.005 inches for a very small droplet and a distance of 0.060 inches for a larger droplet. The viscous material is pushed out of the syringe tip and contacts the substrate while it is still connected to the syringe tip. If the viscous material fails to contact the substrate, it will not adhere to the substrate and no droplet will result. The contacting of the viscous material with the substrate is called "wetting." After the viscous material contacts the surface of the substrate, the tip is pulled back and the resulting string is broken to form a droplet.

One problem with the prior art systems is the stringing or sticking of a bead of the viscous material to the nozzle. This can adversely affect the ability of the delivery system to dispense precise, quantitative amounts of liquid material. Stringing is most likely to occur at lower pressures, for instance, when the pressure in the syringe is ramping up or ramping down. For this reason, stringing also occurs more frequently as dispensing time decreases. Stringing of the liquid material from the nozzle tip during the final stage of dispensing may be avoided to some extent by making the internal pressure of the syringe negative. However, when dispensing again commences, a build-up of liquid at the nozzle tip almost invariably occurs, thus adversely affecting the stability of the subsequent extrusion. Also, to facilitate contact between the viscous material and the workpiece, a robot must constantly move the syringe toward and away from the workpiece, typically in up and down directions. This can significantly slow the manufacturing process.

Another approach to dispensing fluid from a syringe is disclosed in U.S. Pat No. 5,320,250. This dispensing apparatus includes a reservoir or syringe of a viscous material which communicates with a chamber that continuously receives the viscous material. A flexible resilient diaphragm forms an exterior wall of the chamber. An impact mechanism applies a predetermined momentum to the diaphragm to propel a predetermined, minute quantity of the viscous material from the chamber through a nozzle at a high velocity. This minute quantity takes the form of a very small jet of viscous material. As the impact energy is removed by means of a stop, the sudden decrease of the chamber pressure and the forward momentum of the jet "pinches" or stops the jet. For many viscous materials, the chamber is heated to control the viscosity of the material. The reservoir is preferably pressurized with gas to force the viscous material into the chamber. One problem with this type of design is that the high velocity imparted to form the jet of viscous material causes the jet tail to break into smaller droplets forming satellites.

Specific problems are encountered when dispensing solder pastes. Solder pastes typically comprise lead, tin or other metallic particles contained in a viscous material. One problem experienced with these pastes is that they tend to adhere to metallic parts of a dispenser. For example, adherence to metallic parts at the outlet, such as the outlet nozzle, can cause clogging problems over time. Also, when dispensing solder pastes in accordance with the descriptions set forth in the above incorporated applications, the constant impact of the valve member or valve shaft against the metal valve seat compacts the solder paste and causes it to flake, conglomerate and create clogging problems.

To overcome some of the problems of the prior art devices, a two-stage delivery system has been used where the viscous material resides in a syringe under a constant air pressure of about 4 psi to about 12 psi, depending on the viscosity. This insures steady flow of the material into a chamber of a rotary positive displacement pump. The pump dispenses as many as 25,000 dots of the viscous fluid per hour onto a high density, printed circuit (PC) board. Since the viscous material is pushed out of the syringe tip and contacts the substrate while it is still connected to the tip, however, the same problems exist as those described above relating to delivery from a syringe.

For at least these reasons, it would be desirable to provide a dispenser that can more rapidly and effectively apply minute amounts of viscous material to a substrate or workpiece.

SUMMARY OF THE INVENTION

The present invention therefore generally provides apparatus for effectively and rapidly dispensing minute amounts of viscous material, such as solder flux, solder paste or other materials discussed above, in a non-contact manner. That is, the apparatus need not be moved toward and away from the workpiece during the dispensing operation. Various other disadvantages of prior apparatus in this area are overcome through the provision of a dispenser body generally having a valve member mounted for movement therein with respect to a valve seat. The valve member selectively allows viscous material to be discharged from an outlet downstream of the valve seat. In accordance with the invention, a control is operatively connected to the valve member to move the valve member from the closed position to an open position and then rapidly back to the closed position. This rapid succession of movements accelerates the viscous material from the outlet in a thin stream and then positively stops the of material so that the stream breaks away rapidly from the outlet to form a minute droplet of the viscous material.

The dispenser is preferably an air operated dispenser in which the valve member is connected to a piston. The piston and attached valve member are rapidly moved under the force of applied air pressure, preferably from a control valve directly mounting against the dispenser. This direct mounting minimizes the distance between the air outlet of the control valve and the piston. Thus, air pressure can rapidly move the piston and the attached valve member away from the valve seat and, optionally, also move the valve member quickly against the valve seat. In the preferred embodiment, a spring return mechanism is also used to close the valve member against the valve seat. Preferably, to dispense the minute droplets of viscous material in accordance with the invention, air pressure is supplied to the dispenser such that the valve member is opened for a time period of less than about 25 milliseconds. For dispensing solder pastes in accordance with the invention, for example, the time period may be approximately 20 milliseconds. This time period will vary depending on viscosity and pressure characteristics of the viscous material and outlet orifice dimensions of the dispenser. Also in accordance with the invention, a heating element is connected to the dispenser adjacent the outlet. Since only localized heating of the dispenser occurs by this heating element, the control valve may be directly connected to another area of the dispenser without being adversely affected by the heat.

The valve seat may be formed of a rigid material, such as tungsten carbide, when dispensing most viscous materials. However, in accordance with another aspect of the invention, significant benefits are realized if the valve seat is formed of a resilient material, especially when dispensing solder pastes. Solder pastes contain lead, tin or other metallic particles that can cause the paste to compact, flake and potentially clog the dispenser in the vicinity of the valve seat. This is caused by the constant impacts on the material by the valve member against a rigid valve seat. The resilient valve seat of this invention helps prevent these problems and may also contribute a suctioning effect at the end of each dispensing cycle. This suctioning or suck-back effect can prevent accumulation of excess viscous material at the dispenser outlet.

One resilient valve seat of this invention comprises a generally flat, natural or synthetic rubber valve seat member having an outlet bore extending coaxially with the valve member. The material of the valve seat is most preferably a polyisoprene rubber, although many types of resilient materials may be suitable. When dispensing solder pastes, for example, having a viscosity in the range of 300,000 to 450,000 centipoise, the outlet bore may have a diameter of about 10–30 mils or about 0.010 inch to about 0.030 inch.

Another form of the resilient valve seat of this invention includes an outlet bore having a tapered width from a larger dimension closest to the valve member to a smaller dimension closest to the dispenser outlet. Yet another resilient valve seat embodiment includes a plurality of outlet bores extending through the resilient valve seat at an angle toward an outlet. In this embodiment, when the valve member is in the closed position, the valve seat is deformed and pinches or cuts off any flow of viscous material through the plurality of outlet bores. Finally, another embodiment of the resilient valve seat includes an outlet bore offset from the valve member axis. In this embodiment as well, the valve member pinches or cuts off the flow of viscous material through the aperture. In each of the resilient valve seat embodiments, therefore, the valve member will preferably compress the valve seat material and block the outlet bore as a minute droplet is dispensed.

When dispensing minute drops of solder paste, for example, from a resilient valve seat of the invention, the viscous material will enter the outlet bore when the valve member is open. Then, when the valve member is closed preferably within less than about 25 milliseconds, for example, this sudden impact and compression of the valve seat will eject the drop of viscous material. Upon lifting of the valve member from the resilient valve seat and decompression of the valve seat, an advantageous suck-back effect at the dispenser outlet can occur.

In the case of dispensing certain viscous materials, especially solder paste, it has been found highly advantageous to use a low friction polymeric material for dispenser components located generally at the dispenser outlet. Solder pastes can adhere and accumulate on metallic valve shaft and seat structures and on nozzle components. This is believed to be due to the nature of the lead, tin or other metallic particles contained in the paste. The use of a low friction plastic or polymer for such components as the end of the valve member or shaft and the dispenser outlet nozzle has especially aided in preventing significant adherence of solder pastes and resulting clogging problems.

Additional objects and advantages of the various inventive aspects will be realized by those of ordinary skill after reviewing this disclosure.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE PREFERRED EMBODIMENTS

In this description, like reference numerals refer to like structure shown and described in the above incorporated related applications. Like numerals having prime marks (') or double prime marks (") herein refer to analogous structure in the incorporated applications which has been somewhat modified as will be apparent by comparison. Also, it will be appreciated that the principles of the invention may be practiced with respect to each alternative dispenser described in the incorporated applications, or with still other dispensers.

Figure 1:
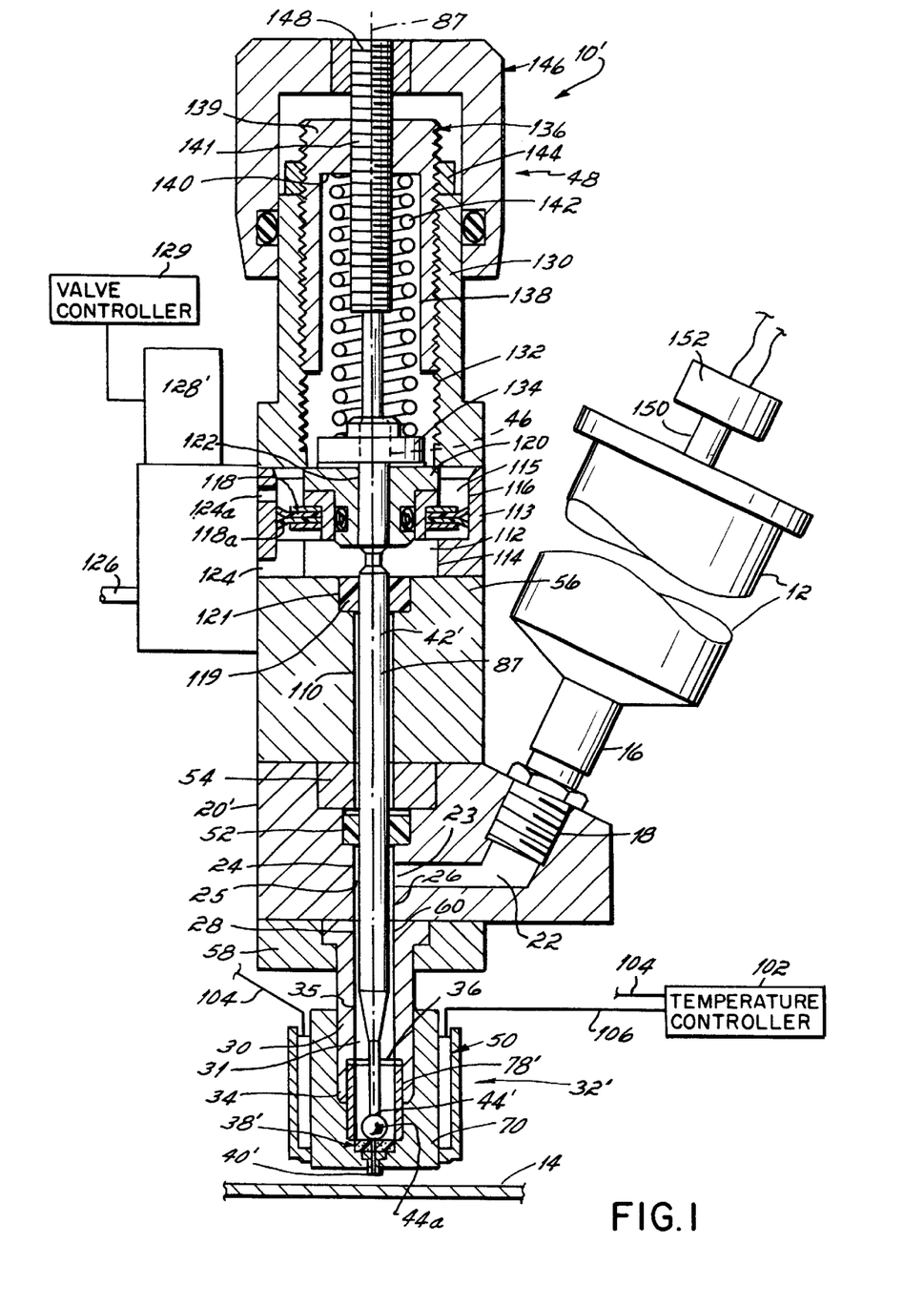
FIG. 1 is a side view, in cross section, of a preferred embodiment of a liquid or viscous material dispensing apparatus disposed above a workpiece.

FIG. 1 illustrates dispensing apparatus 10' for dispensing small amounts of liquid or viscous material initially contained in a syringe 12. Syringe 12 may be a standard, commercially available syringe filled, for example, with solder flux or solder paste 13. The viscous material may be dispensed in minute droplets on a substrate or workpiece 14, such as a printed circuit (PC) board. A dispenser housing 20 of apparatus 10' has an inlet 18 into which is mounted an outlet 16 of syringe 12. The term "housing" is not intended to convey any particular integral or assembled structure but to broadly define the overall support and containment structure of apparatus 10'. Inlet 18 is connected by a bore 22 to an inlet opening 23 of a flow bore 24 forming a flow passage 25. An outlet 26 of flow bore 24 is connected to a first end 28 of a bore 35 extending through an outlet tube 30 and forming a flow passage 31 from which the pressurized liquid or viscous material is dispensed. A valve seat assembly 32' is mounted to a second free end 34 of outlet tube 30. Valve seat assembly 32' has a flow passage 36 extending therethrough with a valve seat 38' disposed therein. The inlet end of flow passage 36 is in flow communication with the flow passage 31 of outlet tube 30 and the opposite outlet end of passageway 36 has a nozzle 40' mounted thereto. Nozzle 40' is advantageously formed of a low friction polymer material, such as polyetheretherketone (PEEK) tubing available from Small Parts, Inc.

Figure 2:
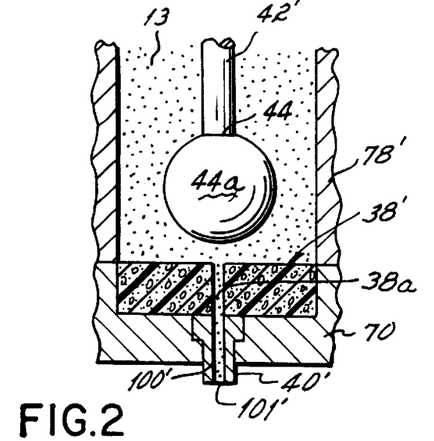
FIG. 2 is a enlarged view of the valve seat area of FIG. 1 showing the valve member in an open position.
Figure 2A:
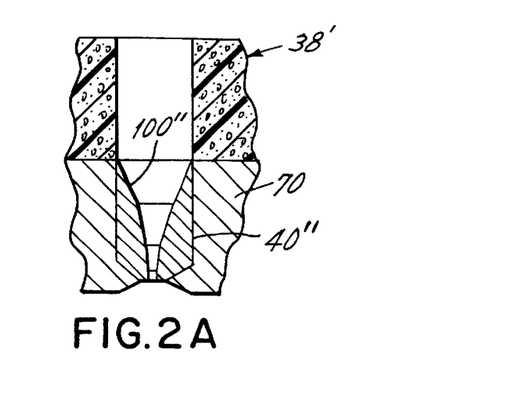
FIG. 2A is an enlarged view of an alternative nozzle.

FIG. 2A illustrates an alternative nozzle 40", also formed from PEEK tubing. However, nozzle 40' includes a tapered bore 100' from the inlet end to the outlet end thereof. For example, this bore may taper from a diameter of 0.0625 inch at the inlet end to between 0.006–0.030 inch at the outlet end based on a length of 0.206 inch. The use of PEEK material or other comparable plastics presents a non-stick surface, especially useful when dispensing solder paste 13, while the taper of bore 100' prevents crowding of particles at the nozzle inlet and generally allows for a smoother flow path.

A valve shaft or valve member 42' extends through flow bore 24 of housing assembly 20', through bore 35 of outlet tube 30 and into flow passage 36 of valve seat assembly 32'. Valve member 42' has a lower end 44' adapted for sealing engagement with valve seat 38' to close passageway 36. As discussed generally above, this may advantageously include a rounded valve end member 44a formed of a low friction polymer material, such as Vespel™ or PEEK. Vespel™ is currently preferred and is available from E.I. du Pont de Nemours and Company, Wilmington, Del. and is a polyimide material. This material inhibits adherence and accumulation of materials, such as solder paste, and therefore can prevent clogging or other dispensing problems. An opposite upper end 46 of valve member 42' is engaged with the control mechanism 48 of dispensing apparatus 10'. Control mechanism 48 reciprocates valve member 42' out of and into seating engagement with valve seat 38'.

Valve seat 38' may be formed of a rigid material, such as tungsten carbide, as is disclosed in the incorporated applications or may be formed of a resilient material, such as a natural or synthetic rubber. Polyisoprene rubber has allowed significantly greater numbers of dispensing cycles without noticeable wear or degradation of the rubber. In general, it is best to use rubbers that exhibit low heat build-up during repeated compression by valve member 42', low reversion and high strength and modulus properties. The preferred polyisoprene has the following formulation, with all components listed in parts per hundred rubber (PHR):

A) A master non-productive batch is first produced with the following components:

| | |
|---|---|
| polyisoprene rubber | 100.00 |
| pentachlorodiphenol | 0.20 |
| hydrated precipitated silica | 0.50 |
| stearic acid | 2.00 |
| zinc oxide | 6.00 |
| antioxidant system | 1.00 |
| phthalic anhydride | 0.50 |
| high abrasion furnace (HAF) black | 35.90 |
| master batch | 146.10 |

A preferred antioxidant system includes Goodrite Stalite (0.75 PHR) and N,N'-Diphenyl-p-phenylenediamine (DPPD) (0.25 PHR).

B) The master batch is then mixed again immediately before adding the curing agents to form the total compound according to the following formula:

| | |
|---|---|
| master batch | 146.10 |
| Santagard ™ post-vulcanization inhibitor | 0.20 |
| cobalt stearate | 2.00 |
| 2,2'-Dithiobis [benzothiazole] (MBTS) | 0.20 |
| sulfur | 3.75 |
| hexamethylenetetraamine 50%/ styrene-butadiene rubber 50% | 1.20 |
| total compound | 153.45 |

Also according to the invention, a heating element 50 is disposed adjacent valve seat assembly 32' to heat a very small volume of the liquid or viscous material in the valve seat assembly as discussed in more detail below. A seal ring 52 is disposed in sealing relation about valve member 42' and is located above inlet 23 of flow passage 24 to insure that the viscous fluid flowing through bore 22 and into flow passage 24 does not leak past valve member 42' and into the control mechanism 48. Seal ring 52 is secured in place by a ring 54 which in turn is held in place by the bottom surface of the housing block 56 of control mechanism 48.

As further shown in FIG. 1, outlet tube 30 has a first end secured to dispenser housing 20' by conventional means, such as a mounting plate 58, so that the outlet 26 of flow passage 24 is aligned with an inlet opening 60 of bore 35 extending through outlet tube 30. The outlet tube 30 has a second end 34 onto which valve seat assembly 32' is secured by conventional means such as by a threaded connection (not shown). A valve seat component 78' is disposed within valve seat assembly 32' and carries valve seat 38'. Also, a temperature controller 102 is connected by leads 104, 106 to heating element 50 in order to selectively and locally heat valve seat assembly 32'.

As seen in FIG. 1, the control mechanism 48 includes housing block 56. A centrally disposed longitudinal bore 110 extends through housing block 56 and is coaxially formed about valve member axis 87. Valve member 42' extends through bore 110 and projects from the upper end of bore 110 into a stepped bore chamber 112 of an air chamber block 113 having a lower bore 114 which intersects an upper bore 116 having a larger diameter than lower bore 114. Two sealing discs 118, 118a formed of glass filled polytetrafluorethylene (PTFE), are mounted onto a support structure 120 which, in turn, has a central bore 122 through which valve member 42' extends and is fixedly attached thereto. Respective air inlets 124, 124a are connected to a source of pressurized air (not shown) by a tube 126. An air solenoid valve 128' operated by a conventional controller 129, and located between tube 126 and inlets 124, 124a, controls the pressurized air used to operate dispenser 10'. As shown in FIG. 1, valve 128' is directly connected against housing assembly 20' adjacent chambers 112, 115. This allows a quicker responsive movement by valve member 42' to the introduction of pressurized air into chamber 112 or 115 than would be possible if solenoid valve 128' had to be mounted away from housing 20'. Such stand-off mountings are practiced, for example, with hot melt dispensers due to the fact that the entire hot melt dispensing gun is heated to a temperature that would adversely affect a directly mounted solenoid valve. Specifically, valve 128' controls air flow into chamber 112 formed below disc 118 in lower bore 114 and a chamber 115 formed by upper bore 116 above seal 118a. An air seal ring 119 about member 42 is located in a counterbore 121 between bore 110 and bore chamber 112 to prevent air leakage into bore 110. Solenoid valve 128' is advantageously mounted directly to dispenser housing 20'. Typical hot melt adhesive guns, for example, use solenoid valves mounted away from the gun body due to the more extreme heat conditions thereof that would adversely affect the solenoid. As solenoid valve 128' is mounted directly to gun body 20', the cycle times of dispensing gun or apparatus 10' are quicker than the same size solenoid valve mounted in a stand-off fashion. One particular solenoid valve 128' useful for this invention is Model 35A-BOO-DDFA-1BA, Modification M599 from MAC Valve Co. in Wixsom, Mich.

A spring housing 130 is mounted against the top surface of air chamber block 113 and is formed with a central bore 132. A spring retainer 134 is securely mounted onto the upper end of valve member 42' and abuts against the support structure 120. A cup-shaped spring adjustment component 136 is threadably secured to spring housing 130 and has an elongated bore 138 open at one end and closed at the other end by a base 139 with a bore 141 extending therethrough and an interior bottom surface 140 about bore 141. A compression spring 142 extends between spring retainer 134 and the bottom surface 140 of spring adjustment component 136. A lock nut 144 is threadably secured to spring adjustment component 136 by threads so that the component 136 can be locked into position closer to or farther away from spring retainer 134. The compression of spring 142 is increased as the spring component 136 is moved towards spring retainer 134 and decreased as the spring component 136 is moved away from spring retainer 134.

One feature of the invention relates to the closure force exerted by compression spring 142 on spring retainer 134 and, ultimately, by valve end 44a on valve seat 38'. Preferably, compression spring 142 has a free length of 1.15 inches and exerts a closure force of between about 17 pounds and about 28½ pounds. The compression of spring 142 can be adjusted by positioning spring adjustment component 136, as previously discussed. To add to the quickness of the spring return shut-off, pressurized air may be directed into chamber 115, as discussed below.

Another feature of the control mechanism 48 is a knob 146 which is attached to a rod 148 that is threadably secured in bore 141 and which passes through compression spring 142 to bear against the top end of valve member 42' extending above the spring retainer 134. By moving the rod 148 up or down, the stroke of the valve member 42' can be adjusted with respect to the valve seat 38'.

To further appreciate the advantages of the present invention, a description of the operation is appropriate. First, a syringe 12 of liquid or viscous material, typically having a viscosity of between about 25,000 and about 500,000 centipoise, is mounted to the inlet opening 18 of a dispenser housing 20'. An air tube 150 connected to a pressure regulator 152 and a source of low pressure air (not shown) is coupled to the inlet of syringe 12 to force the liquid or viscous material into bore 22 and flow passage 24 about the valve member 42' at a constant pressure of about 4 psi to about 30 psi. In the default closed position, as shown in FIG. 1, the valve seat component 78' above valve seat 38' is filled with a small amount of the liquid or viscous material while valve end 44a is seated against valve seat 38'. The mounting body 70 is formed of a heat conducting material, such as brass, to locally transfer heat from heating element 50. Heating element 50 is disposed around and secured to mounting body 70 and therefore transfers heat through body 70 into valve seat component 78', which may be constructed of tungsten carbide, to heat the liquid or viscous material in valve seat component 78' which surrounds valve member 42'.

During this stage of operation, the liquid or viscous material, such as an adhesive, a solder flux or a solder paste, is heated to a temperature range (depending on the material) of between about 22° C. to about 90° C. For example, solder pastes having a viscosity of between 300,000 centipoise and 450,000 centipoise are preferably heated at about 160° F. (88° C.). Solder flux may be heated at about 40° C. to about 65° C. Therefore, while the viscous material is briefly located in valve seat component 78', the material is briefly heated prior to dispensing.

Figure 3:
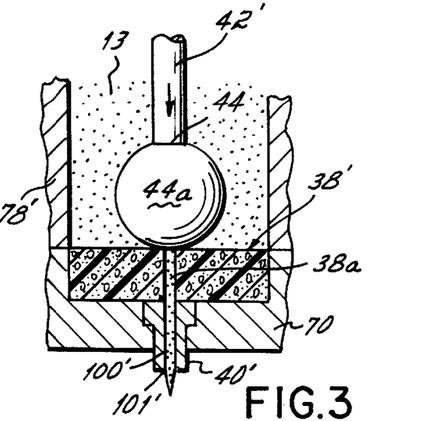
FIGS. 3–5 are views similar to FIG. 2 but showing the valve member progressively moving to a fully closed position to dispense a minute droplet of viscous material.
Figure 4:
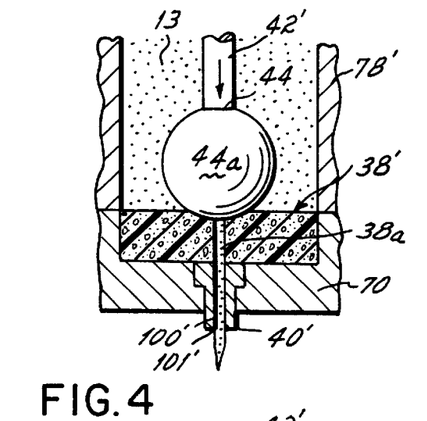
Figure 5:
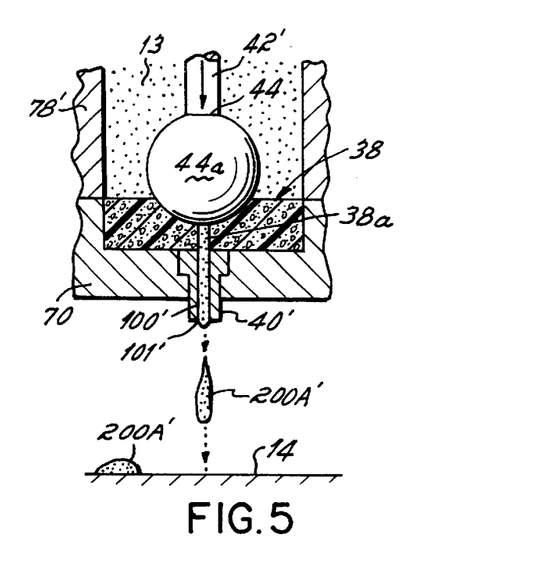
Figure 6:
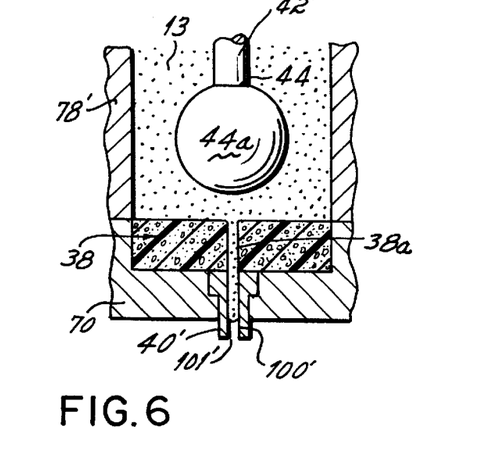
FIG. 6 is a view similar to FIG. 2, but showing the valve member in the open position and for a suck-back effect at the nozzle.

Although the present description of the operation is generally applicable to all embodiments of this invention which incorporate various types of valves and valve seats, the description will now be more specifically described while referring to FIGS. 2–6. The same description below applies to FIG. 2A as well. After the valve end 44a raises from seat 38' as shown in FIG. 2, the viscous material 13, such as solder paste, is very briefly pushed through orifice 38a of seat 38' and orifice 100 of nozzle 40' as a thin stream (FIG. 3). Then, after valve end 44a impacts and closes against valve seat 38' as shown progressively in FIGS. 4 and 5, the sudden deceleration of the flowing material 13 overcomes the material yield stress and breaks the stream into a minute droplet 200A'. This causes the viscous material to break off from the nozzle 40' rather than flow into a string. Referring to FIGS. 4 and 5, when valve seat 38' is a resilient material, such as the polyisoprene describe above, it will compress as shown. In the preferred embodiment, when dispensing solder paste 13, the total stroke length of valve member 42 is about 0.100 inch. The depth of penetration into valve seat 38' is about 0.025 inch. However, these distances may be changed, for example, to alter the droplet size. It is important to maintain the material at the selected temperature range for only a brief period of time and not to exceed the temperature where the catalyst or solid particles melt and/or cure. For this reason, only the valve seat component 78' is heated and not the remainder of dispensing apparatus 10'. As also discussed above, this localized heating has the benefit of allowing shorter cycle times due to the direct mounting of solenoid valve 128'. As shown in FIG. 6, when a resilient valve seat 38' is used, the initial movement of valve end 44a away from valve seat 38' will decompress the resilient material and may thereby contribute a material suck-back effect to prevent accumulation, stringing or drooling of the material 13 at the outer end of nozzle 40'.

Specifically, to open dispenser 10', valve member 42' is retracted to withdraw valve end 44a from valve seat 38'. More specifically referring to FIG. 1, this step is accomplished by introducing pressurized air from air solenoid 128' through air inlet 124 and into the air chamber 112 located below diaphragm seal 118. Air pressure applied against seal 118 moves valve member 42' in a direction away from valve seat 38' and towards compression spring 142. During this period of operation, the heated viscous material flows as directed below.

To almost immediately break the flowing string of liquid or viscous material, air solenoid 128' is activated by controller 129 to switch the flow of air from passage 124 to passage 124a. Then, pressurized air applied against seal 118a as well as the force of spring 142 will move valve end 44a against valve seat 38'. Switching air pressure to passage 124 off should occur in a very short period of time, i.e., less than about 25 milliseconds between respective "on" and "off" signals sent to solenoid 128 by controller 129. In the solder paste example given above, a time period of about 20 milliseconds worked well. It is believed that this time period could range from about 5 milliseconds to about 50 milliseconds depending on factors such as material viscosity, material pressure and orifice sizes. In the embodiment shown in FIG. 1, solenoid valve 128 is a so-called four-way electromagnetically actuated valve which allows air in chamber 112 to be exhausted and pressurized air from line 126 to be redirected immediately to chamber 115. Although less preferable, especially when dispensing solder pastes, a three-way valve can also be used in the manner disclosed in the applications incorporated herein. When either a three-way valve or a four-way valve is used, compression spring 142 rapidly moves valve end 44a to a seated position against valve seat 38' when pressurized air in chamber 112 is exhausted. This is a positive displacement step which pushes the heated liquid or viscous material out of the outlet end of nozzle 40'.

One aspect of the invention is to deform viscous material at a high frequency so that the material acts as a solid for a very brief period of time and then returns to a more fluid state when it breaks away from the outlet end 101' of orifice 100'. With orifices 38a and 100' having a diameter of between about 0.010 inch and about 0.030 inch, single solder paste droplets were produced with about 0.025 inch to about 0.090 inch diameters. In these cases, the syringe pressures ranged from about 10–25 psi. Of course, larger droplets may be produced according to the methods described in the above incorporated applications. Orifice diameters could also be lower as described in the above incorporated applications or could be larger as when dispensing solder pastes, due mainly to the increased viscosity. To address the range of materials and droplet sizes mainly of concern to this invention, the outlet orifice diameters, such as of orifices 38a and 100', may be from about 0.005 inch to about 0.050 inch.

Figures 7, 8, 9, 10:
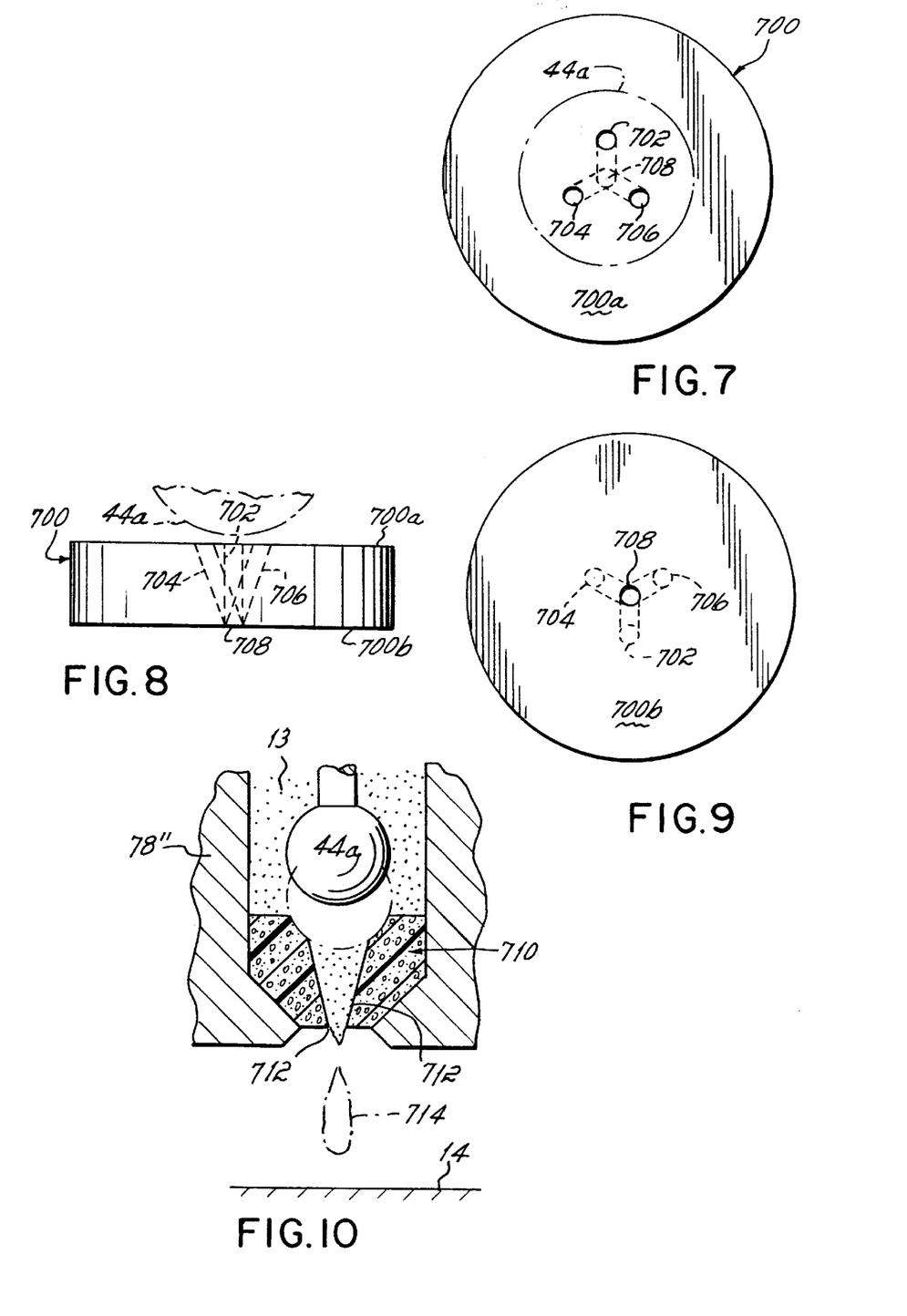
FIG. 7 is a top plan view of another alternative resilient valve seat having a plurality of angled outlet bores.
FIG. 8 is a side elevational view of the embodiment shown in FIG. 7.
FIG. 9 is a bottom view of the embodiment shown in FIG. 7.
FIG. 10 illustrates an alternative valve seat embodiment, similar to FIG. 2, but eliminating the nozzle and showing a tapered outlet bore in the valve seat member.
Figure 11:
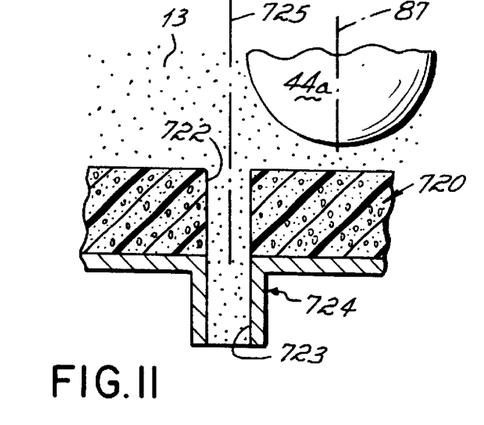
FIGS. 11–14 illustrate another resilient valve seat with an alternative valve member location and movement while dispensing of a minute droplet of viscous material.

FIGS. 7–9 illustrate yet another embodiment of a resilient valve seat member 700. Valve seat 700 may also be formed of natural or synthetic rubber, such as polyisoprene, as described above for valve seat 38'. Also, valve seat 700 may be acted upon by valve member end 44a in the same manner as generally described above with respect to FIGS. 1–6.

However, valve seat 700 instead includes a plurality of angled orifices 702, 704, 706. Orifices 702, 704, 706 angle toward one another from an per side 700a of valve seat 700 to a lower side 700b thereof as shown best in FIG. 8. Orifices 702, 704, 706 preferably meet at a single outlet 708 on the lower side 700b of valve seat 700. In all other general respects, the embodiment of FIGS. 7–9 will operate generally as described above with respect to FIGS. 2–6.

FIG. 10 illustrates an alternative valve seat 710 which, like the embodiment shown in FIGS. 1–6, may be formed of a resilient material such as a synthetic or natural rubber as described above. For example, valve seat 710 may also be formed of polyisoprene as described above with respect to valve seat 38'. The main difference between the embodiment shown in FIG. 10 and the embodiment of FIGS. 1–6 is that nozzle 40' has been eliminated and valve seat component 78' has been modified to hold valve seat 710. Optionally, a nozzle as described or incorporated herein may be used with valve seat 710. Valve seat 710 includes an orifice 712 which is tapered in diameter from an upper end 712a to a lower end 712b. Otherwise, valve seat 710 operates in the same general manner as described above with respect to valve seat 38' to dispense a minute droplet 714 of viscous material 13. Preferably, the lower end 712b of orifice 712 has a diameter of a size similar to the orifice or outlet bore sizes mentioned above. The taper is contemplated to be of such a nature that the upper end 712a has a diameter of roughly two to three times the diameter of the lower end 712b.

Figure 12:
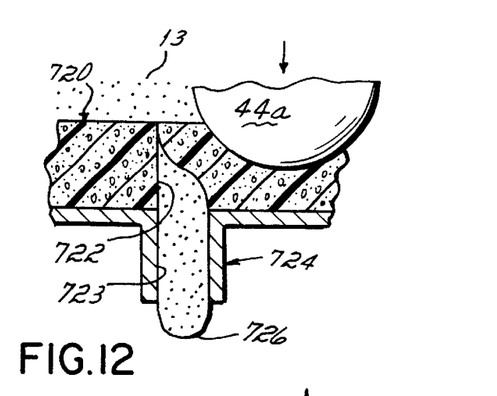
Figure 13:
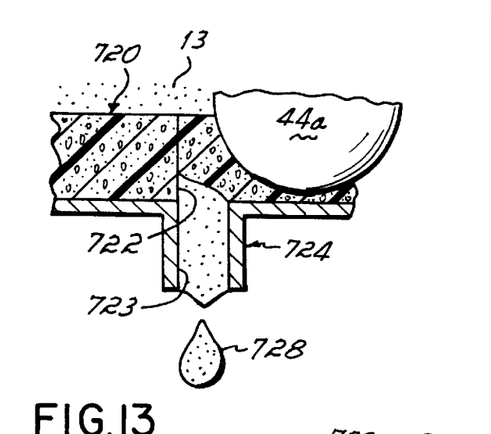

FIGS. 11–14 illustrate yet another valve seat and valve actuating embodiment. In this embodiment, a valve seat 720, again preferably formed of a natural or synthetic rubber, such as polyisoprene, includes an orifice 722 aligned with another orifice 723 of a nozzle 724. In this case, however, valve member axis 87 is offset from, but parallel to, an axis 725 generally defining the aligned orifices 722, 723. Valve end 44a is caused to move against valve seat 720 using a control, apparatus and method as generally described above with respect to FIGS. 1–6. However, as valve end 44a is offset from orifice 722, valve seat material will be deformed into orifice 722 to pinch off and close orifice 722 as shown in FIG. 12 and, at the same time, push out a thin stream of viscous material 726. In the same sudden manner as described above, this thin stream 726 will break off into a minute droplet 728 as shown in FIG. 13 when valve end 44a fully impacts against valve seat 720. As further shown in FIG. 14, when valve end 44a is retracted, and resilient valve seat 720 decompresses into its normal state, a suck-back effect may occur within nozzle 724 to prevent accumulation of viscous material 13 and/or dripping or stringing at nozzle outlet 724a.

Figure 14:
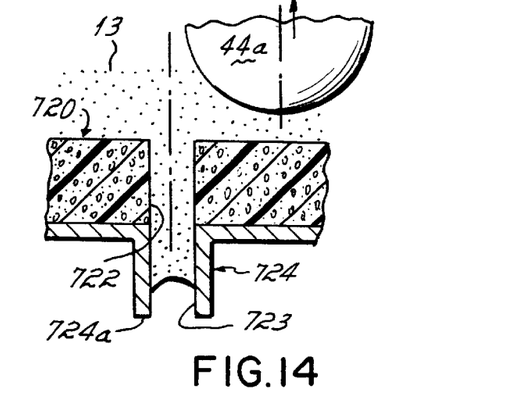
Figure 15:
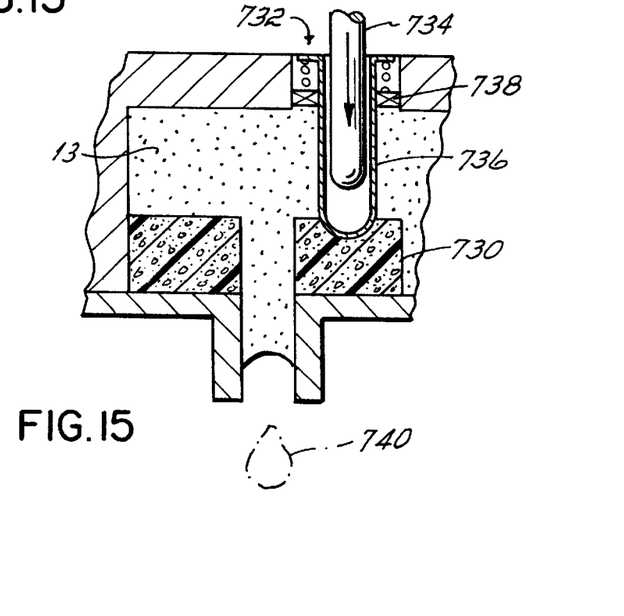
FIG. 15 illustrates another embodiment of a resilient valve seat and valve actuating structure.

FIG. 15 illustrates an alternative valve seat 730 and valve actuating structure 732 which operates similarly to the embodiment depicted in FIGS. 11–14. The main difference is that the valve member or valve shaft 734 is contained within a movable actuator member 736 which is sealed off or isolated from the viscous material 13, such as the solder paste. This prevents any solder paste 13 from being impacted between the valve seat 730 and the valve shaft or valve member 734. Specifically, the valve seat actuator member 736 may simply be a cylindrical member that may be reciprocated by the action of valve member or valve shaft 734. The valve seat actuator member 736 is mounted for reciprocation within a seal 738. Thus, when the valve member or valve shaft 734 is at the bottom of its stroke, the valve seat 730 will be deformed as shown in FIG. 14 and a drop 740 of solder paste 13 may be dispensed in the same manner as described above. In this embodiment, however, as there is no contact between the valve member 734 and the solder paste 13, wear on the valve seat 730 by the solder paste may be prevented.

While the invention has been described in combination with various embodiments thereof, it is evident that many alternatives, modifications, and variations and combinations of features will be apparent to those skilled in the art in light of the disclosure specifically contained herein or incorporated herein or otherwise available in the art. Accordingly, the invention is intended to embrace all such alternatives, modifications and variations as fall within the spirit and scope of the appended claims.

We claim:

1. Apparatus for dispensing small amounts of viscous material, the apparatus comprising:

a dispenser housing having a chamber, an inlet for receiving a supply of the viscous material and an outlet for discharging the viscous material, a valve member disposed within said dispenser housing and having a piston disposed within said chamber and operative to move said valve member within said dispenser housing in response to pressurized air being directed into said chamber, a valve seat disposed proximate said outlet and having an orifice communicating with said outlet, one end of said valve member being capable of moving with respect to said valve seat to define open and closed positions of said orifice, said valve seat being at least partially formed of resilient material such that said valve member deforms said valve seat in said closed position, and a control valve mounted against said housing for intermittently directing pressurized air into said chamber, and moving said valve member quickly between the open and closed positions during the dispensing of the small droplets of viscous material, and a heating element disposed proximate said dispenser outlet for locally heating the viscous material prior to dispensing the small droplets.

2. The apparatus of claim 1, wherein said resilient material is a rubber material.

3. The apparatus of claim 1, wherein said resilient material is polyisoprene rubber.

4. The apparatus of claim 1 further comprising a source of pressurized viscous material operatively connected to said inlet, wherein the viscous material is supplied by said source at a pressure of less than about 30 psi.

5. The apparatus of claim 1 further comprising a nozzle assembly disposed at one end of said dispenser housing.

6. The apparatus of claim 5 wherein said nozzle assembly is formed from a low friction polymer material.

7. The apparatus of claim 1 wherein said valve member is offset from said valve seat orifice and, in the closed position, said valve member deforms said resilient material to close said orifice.

8. The apparatus of claim 1 wherein at least said end of the valve member that engages said valve seat is formed from a low friction polymer material.

9. A method for rapidly dispensing a small quantity of a viscous material during the manufacture of an electronic device, the viscous material having a viscosity of at least about 25,000 centipoise and being dispensed from a dispenser including a valve member, a viscous material passage and a resilient valve seat disposed on a rigid valve seat support member and having an orifice, the method comprising the steps of:

moving the valve member out of engagement with said resilient valve seat, holding the viscous material in the viscous material passage at a pressure of about 4 psi to about 30 psi, introducing the viscous material into the orifice from the viscous material passage, and compressing the valve seat with the valve member against the rigid valve seat support member to close the orifice of the valve seat and dispense a small droplet of the viscous material from the orifice and onto the electronic device.

10. The method of claim 9, wherein the valve member is moved coaxially with respect to the orifice.

11. The method of claim 9, wherein the valve member is moved along an axis which is offset from an axis of the orifice.

12. The method of claim 9 further comprising the step of decompressing the valve seat and thereby suctioning excess viscous material into the orifice.

13. Apparatus for dispensing small amounts of viscous material, the apparatus comprising:

a dispenser housing having an inlet for receiving a supply of said viscous material and an outlet for discharging said viscous material, a valve member having an end portion and mounted for movement within said dispenser housing between open and closed positions, a rigid valve seat support member, and a valve seat disposed on said rigid valve seat support member proximate said outlet, said valve seat having a resilient portion with a plurality of orifices, said end portion of said valve member being capable of engaging and compressing said resilient portion of said valve seat in said closed position to block each orifice and to dispense the viscous material from each orifice.

14. The apparatus of claim 13, wherein said valve seat has an inlet side and an outlet side and said plurality of orifices angle toward each other in a direction from said inlet side to said outlet side to dispense said viscous material in the form of a single droplet.

* * * * *